(12) United States Patent
Ngo

(10) Patent No.: US 9,054,941 B2
(45) Date of Patent: Jun. 9, 2015

(54) CLOCK AND DATA RECOVERY USING DUAL MANCHESTER ENCODED DATA STREAMS

(71) Applicant: RF Micro Devices, Inc., Greensboro, NC (US)

(72) Inventor: Christopher Truong Ngo, Queen Creek, AZ (US)

(73) Assignee: RF Micro Devices, Inc., Greensboro, NC (US)

( * ) Notice: Subject to any disclaimer, the term of this patent is extended or adjusted under 35 U.S.C. 154(b) by 0 days.

(21) Appl. No.: 14/334,978

(22) Filed: Jul. 18, 2014

(65) Prior Publication Data

US 2015/0023458 A1 Jan. 22, 2015

Related U.S. Application Data

(60) Provisional application No. 61/847,885, filed on Jul. 18, 2013.

(51) Int. Cl.
*H04L 5/16* (2006.01)
*H04L 25/49* (2006.01)

(52) U.S. Cl.
CPC .................................. *H04L 25/4904* (2013.01)

(58) Field of Classification Search
CPC ............ H04B 1/40; H04B 3/23; H04B 10/40; H04B 3/44; H04L 1/243; H04L 27/2601
USPC .......... 375/219, 256, 295, 297, 347; 341/126, 341/141, 144
See application file for complete search history.

(56) References Cited

U.S. PATENT DOCUMENTS 8,391,402 B2 * 3/2013 Laurent et al. ................. 375/295
8,615,055 B2 * 12/2013 Milotta et al. ................. 375/324

OTHER PUBLICATIONS

Allen, P.E., "Lecture 200—Clock and Data Recover Circuits-I," PowerPoint Presentation, Jun. 26, 2003, 32 slides.
Zamarreño-Ramos, Carlos, et al., "An Instant-Startup Jitter-Tolerant Manchester-Encoding Serializer/Deserializer Scheme for Event-Driven Bit-Serial LVDS Interchip AER Links," IEEE Transactions on Circuits and Systems I: Regular Papers, vol. 58, No. 11, Nov. 2011, pp. 2647-2660.

* cited by examiner

*Primary Examiner* — Khai Tran
(74) *Attorney, Agent, or Firm* — Withrow & Terranova, P.L.L.C.

(57) ABSTRACT

Two Manchester encoded bit streams each bit stream with accompanying embedded clock data are disclosed. The two encoded bit streams are encoded at the source using opposite polarities of the source clock to position transitions within the bit streams at the rising and falling edges of the source clock. The receiver may extract the clock data from both bit streams. Because both rising and falling edge clock data is available between the two bit streams, the receiver does not need a phase locked loop (PLL) or incur the accompanying expense of such PLL. Further, by avoiding use of a PLL, a nearly all digital circuit may be created, which may provide further cost and space savings. Still further, a higher data throughput is provided without increasing pin count or signal bandwidth.

20 Claims, 14 Drawing Sheets

US 9,054,941 B2

CLOCK AND DATA RECOVERY USING DUAL MANCHESTER ENCODED DATA STREAMS

RELATED APPLICATION

This application claims the benefit of provisional patent application Ser. No. 61/847,885, filed Jul. 18, 2013, the disclosure of which is hereby incorporated herein by reference in its entirety.

FIELD OF THE DISCLOSURE

The present disclosure relates to serial data streams.

BACKGROUND

Computing devices are common in modern society. The ease with which such computing devices perform myriad functions is enabled through complex integrated circuits instantiated on separate chips. In many instances different circuits on separate chips may need to communicate with one another inside the computing device. Such interchip communication may be effectuated by a serial data bus.

As the level of complexity increases, the amount of data that needs to be transferred between chips increases. There are generally two ways to increase the rate of data transfer. The first way is to increase the number of data channels between the chips by increasing the pin count on the chips and routing appropriate conductors between the pins. Each data channel may be a separate serial data channel, but collectively they may be considered a parallel bus. Increases in the number of data channels through additional pins and conductors is relatively expensive and may lead to design complications as the extra conductors must be routed in such a manner that limits electromagnetic interference and area consumption. The second way is to increase the clock frequency associated with the data channel. Increases in clock frequency may generate additional electromagnetic interference concerns.

Accordingly, there is a desire to increase options available to circuit designers for improved serial data transmission across a single data channel.

SUMMARY

Aspects of the present disclosure provide two or more Manchester encoded bit streams, where each bit stream has accompanying embedded clock data. The two encoded bit streams are encoded at the source using phase shifts of the source clock. In an exemplary aspect, there are two Manchester encoded bit streams and the phase shift is a 180 degree phase shift, which makes the two streams of opposite polarities for a fifty percent duty cycle clock. The receiver may extract the clock data from both bit streams. Because both rising and falling edge clock data is available between the two bit streams, the receiver does not need a phase locked loop (PLL) or incur the accompanying expense of such PLL. Further, by avoiding use of a PLL, a nearly all digital circuit may be created, which may provide further cost and space savings. Still further, a higher data throughput is provided without increasing pin count or signal bandwidth.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Aspects of the present disclosure provide two or more Manchester encoded bit streams, where each bit stream has accompanying embedded clock data. The two encoded bit streams are encoded at the source using phase shifts of the source clock. In an exemplary aspect, there are two Manchester encoded bit streams and the phase shift is a 180 degree phase shift, which makes the two streams of opposite polarities for a fifty percent duty cycle clock. The receiver may extract the clock data from both bit streams. Because both rising and falling edge clock data is available between the two bit streams, the receiver does not need a phase locked loop (PLL) or incur the accompanying expense of such PLL. Further, by avoiding use of a PLL, a nearly all digital circuit may be created, which may provide further cost and space savings. Still further, a higher data throughput is provided without increasing pin count or signal bandwidth.

Figure 1:
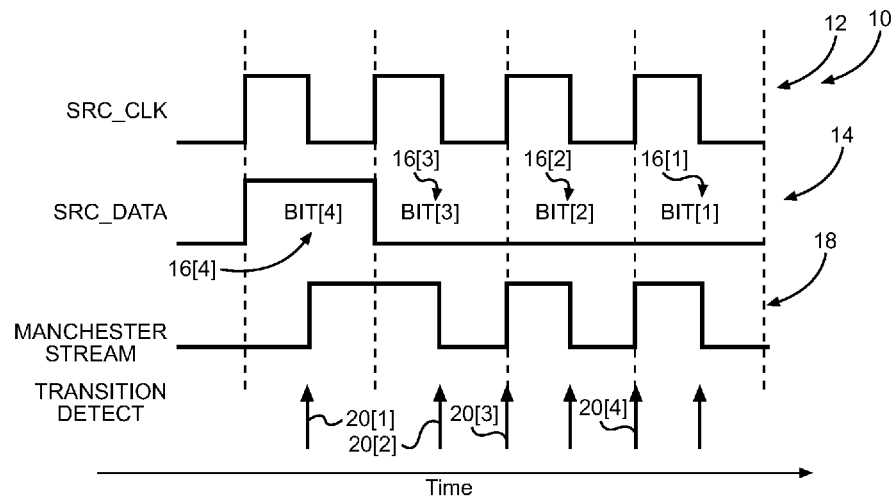
FIG. 1 illustrates a conventional Manchester encoding scheme with the transition detection highlighted.

Before addressing exemplary aspects of the present disclosure, a brief overview of a conventional Manchester encoding scheme is provided with reference to FIG. 1. In particular, FIG. 1 illustrates a signal versus time chart 10. The source clock signal 12 is denoted SRC_CLK and the data signal 14 is denoted SRC_DATA. As illustrated, the data signal has four bits 16[1]-16[4]. The encoded bit stream 18 is denoted MANCHESTER STREAM. As is understood in the Manchester encoding scheme, an edge (rising or falling) is always guaranteed at the mid-bit boundary such as is illustrated at points 20[1] and 20[2]. If there are consecutive 0 s or 1 s in the data signal 14, such as the repeated 0 s of bits 16[3]-16[1], transitions will also appear in the boundary as is illustrated at points 20[3], 20[4]. Because the transition is non-periodic, clock recovery is complicated and typically requires a PLL to be used as part of the clock recovery circuit. PLLs typically consume relatively large amounts of power, which may be undesirable in battery operated devices, such as a mobile terminal. Further, PLLs typically consume relatively large areas within an integrated circuit. Such space consumption may be undesirable in small portable devices, such as a mobile terminal. Still further, a PLL must go through a training sequence to provide a good reference to the PLL lock circuit. Once lock is achieved, data recovery can start. Waiting for the lock increases latency. An additional concern is that with arbitrarily large data sequences, PLLs can lose lock (i.e., "drift"). While a delay circuit may be used that is targeted for a specific frequency range, such specific circuitry restricts the versatility of the circuit. Accordingly, new signaling systems may be provided to increase design flexibility for serial data streams.

Figure 2:
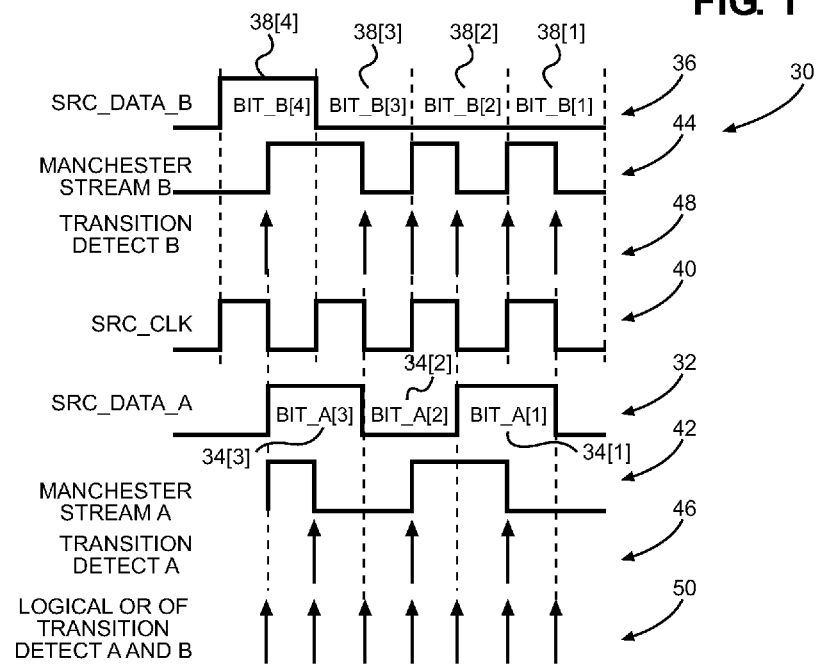
FIG. 2 illustrates a two bit stream Manchester encoding scheme according to an exemplary aspect of the present disclosure.

In this regard, FIG. 2 illustrates a signal versus time chart 30 having two data streams encoded according to a Manchester encoding scheme. The first data signal has a bit stream 32 labeled SRC_DATA_A with bits 34[1]-34[3]. The second data signal has a bit stream 36 labeled SRC_DATA_B with bits 38[1]-38[4]. The source clock signal 40 is denoted SRC_CLK. As is readily apparent, bit stream 32 has a 180 degree phase shift (i.e., one-half clock cycle) relative to bit stream 36. Each bit stream 32, 36 has its respective Manchester stream 42, 44 with respective transitions 46, 48. Thus, each stream has user information and some percentage of timing information. It should be appreciated that if a logical OR of transitions 46, 48 is taken at the receiver (or decoder) (see signal 50), all the clock edges of the source clock signal 40 may be reproduced. Such recovered clock may then be used to sample the two bit streams to recover the original data signals for bit streams 32, 36. With any multi-Manchester stream, there will be at least two edges per clock period. These edges are sufficient to recover the clock without the use of a PLL and, this recovery is not dependent on data length or data content.

Figure 3:
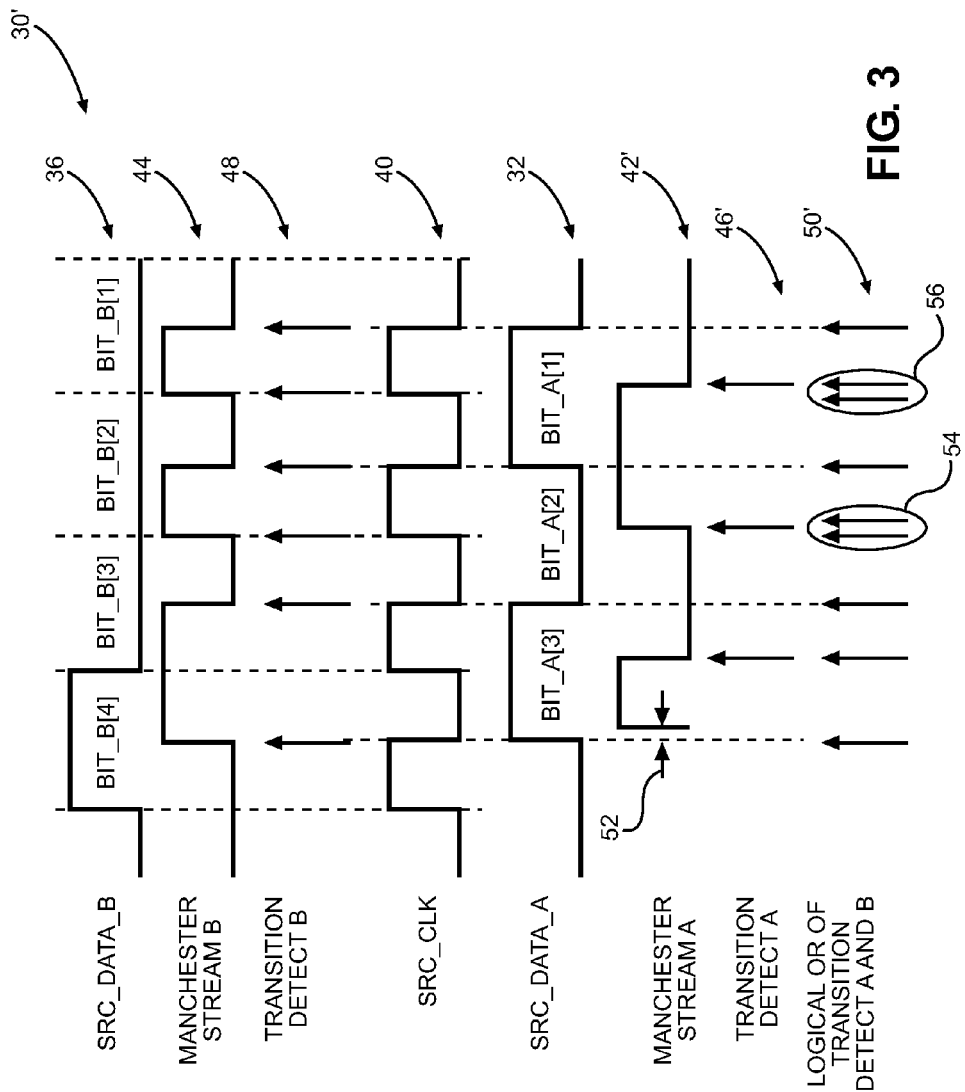
FIG. 3 illustrates a two bit stream Manchester encoding scheme with skew between the two bit streams highlighted.

While building an encoder and decoder that encodes the two bit streams for transmission on respective data channels is readily accomplished, such system may introduce errors in the bit stream because of skew between the two bit streams. That is, propagation delays for the two bit streams 32, 36 may not be, and likely are not, identical. In this regard, FIG. 3 illustrates a signal versus time chart 30', substantially similar to signal versus time chart 30 of FIG. 2, but with skew 52 arising in Manchester stream 42', which in turn causes a change in the transition 46' relative to transition 46. The skew 52 causes the logical OR of transitions 46', 48 (see signal 50') to include double pulses 54, 56. Such double pulses 54, 56 may cause unwanted sampling of the data in a predominantly digital system.

Thus, it may advantageously to filter out double pulses 54, 56 that occur within a predefined threshold. Such predefined threshold may be set based on an expected timing skew on the bus. An exemplary solution to this issue is provided in a communication system 60 of FIG. 4A. In particular, a one-shot circuit (e.g., a monstable multivibrator) may be used to cull the double pulses. In this regard, the communication system 60 includes an encoder 62 and a decoder 64. The encoder 62 receives a first data signal (e.g., bit stream 32) from a first data source, a second data signal (e.g., bit stream 36) from a second data source, and a clock signal (e.g., clock signal 40) from a clock. Note that in an exemplary aspect, the data sources and clock may be part of the same integrated circuit as the encoder 62, or the data sources and/or the clock may be positioned off chip. The clock signal 40 is passed to an inverter 66, flip flops 68, 70 and exclusive OR (XOR) gates 72, 74. Flip flop 68 also receives bit stream 32 and outputs to the XOR gate 72. Similarly, flip flop 70 receives bit stream 36 and outputs to the XOR gate 74. The propagation delay through the flip flops 68, 70 to the XOR gates 72, 74 will always be greater than the delay of the clock signal 40 to the XOR gates 72, 74. Collectively, the inverter 66, the flip flop 68, and the XOR gate 72 are a first stream encoder 73. Likewise, collectively, the flip flop 70 and XOR gate 74 are second stream encoder 75. The outputs of the XOR gates 72, 74 couple the Manchester encoded bit streams into to respective data channels 76, 78, which are both received by decoder 64.

Figure 4A:
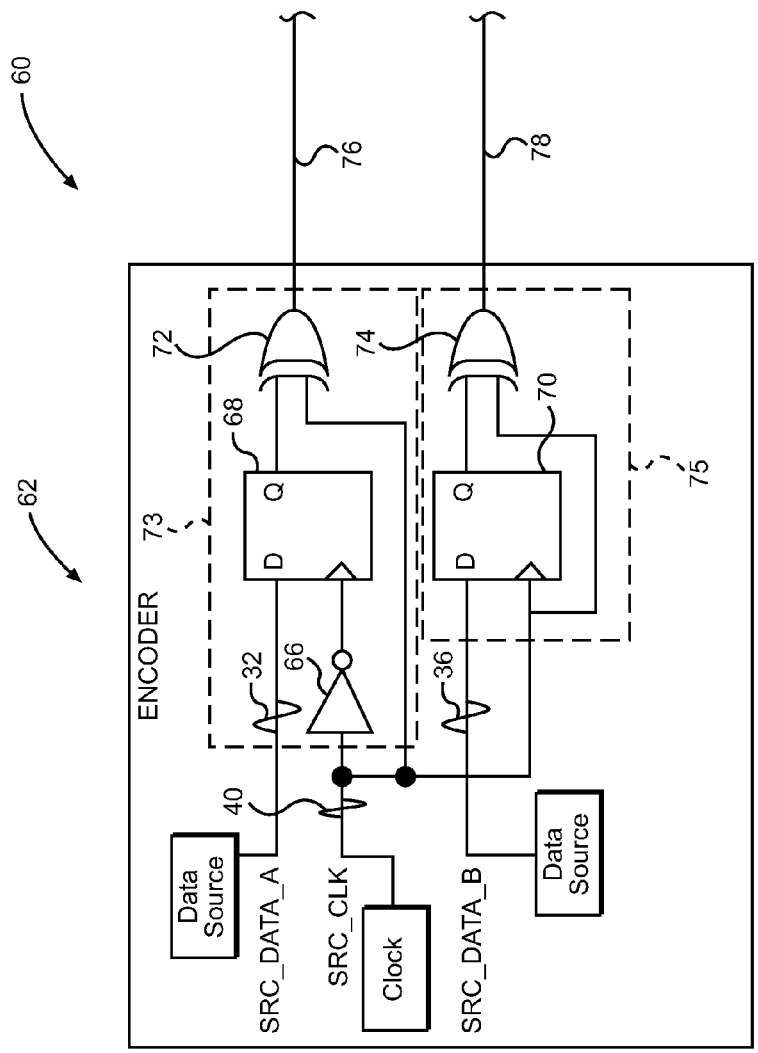
FIG. 4A illustrates exemplary encoder and decoder circuits capable of addressing the skew illustrated in FIG. 3.
Figure 4A:
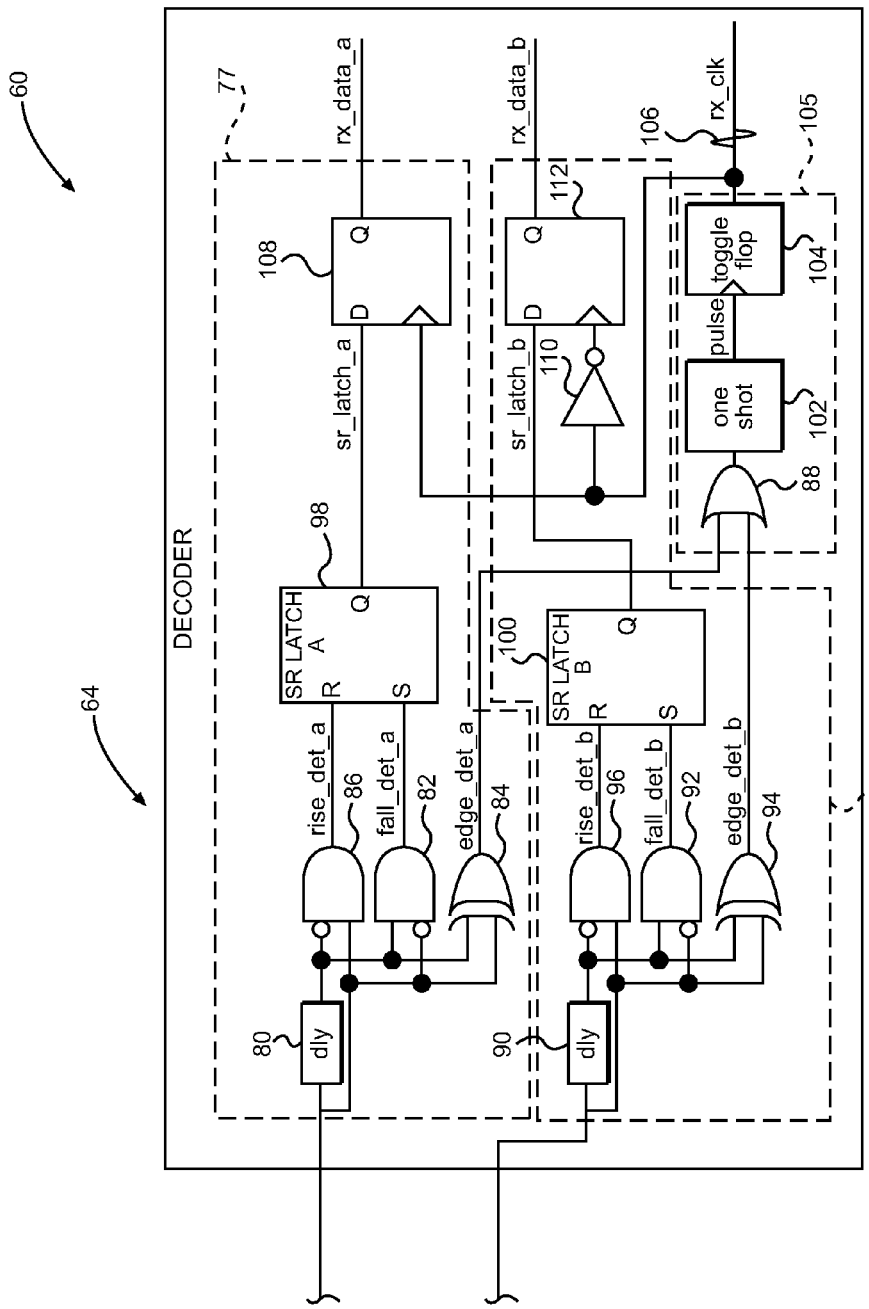

With continued reference to FIG. 4A, the decoder 64 receives the signals from the data channels 76, 78 and processes them with first stream decoder 77 and second stream decoder 79 respectively. The incoming signal from the data channel 76 is split into a delay element 80, an inverted input of an AND gate 82 and an XOR gate 84. The output of the delay element 80 is provided to an inverted input of an AND gate 86, an input of AND gate 82 and the XOR gate 84. The AND gate 86 effectively detects the rising edge of the received signal. Similarly, the AND gate 82 effectively detects the falling edge of the received signal. The XOR gate 84 detects the transitions on the data channel. The output of the XOR gate 84 is provided to an OR gate 88. The output of the AND gates 82, 86 is provided to a latch 98.

With continued reference to FIG. 4A, the decoder 64 processes the signal from the data channel 78 in similar fashion. In particular, the incoming signal from the data channel 78 is split into a delay element 90, an inverted input of an AND gate 92 and an XOR gate 94. The output of the delay element 90 is provided to an inverted input of an AND gate 96, an input of AND gate 92 and the XOR gate 94. The AND gate 96 effectively detects the rising edge of the received signal. Similarly, the AND gate 92 effectively detects the falling edge of the received signal. The XOR gate 94 detects the transitions on the data channel. The output of the XOR gate 94 is provided to the OR gate 88. The output of the AND gates 92, 96 is provided to a latch 100.

With continued reference to FIG. 4A, the output of the OR gate 88 is provided to a one-shot circuit 102. The one shot circuit 102 provides an output to a toggle flop 104. Collectively the OR gate, the one shot circuit 102 and the toggle flop 104 may be considered a clock recovery circuit 105. The output of the toggle flop 104 is the recovered clock signal 106, which is provided to a flip flop 108 and an inverter 110. The output of the inverter 110 is provided to a flip flop 112. The output of the flip flop 108 is the recovered bit stream 32 (i.e., a recovered version of SRC_DATA_A). Likewise, the output of the flip flop 112 is the bit stream 36 (i.e., a recovered version of SRC_DATA_B).

In Manchester encoding, a logical one or logical zero are represented by rising or falling edges in the serial data stream. For this reason, the latches 98, 100 can be used to detect the logic level of the serial data from the respective AND gates (82 and 86 for latch 98 or 92 and 96 for latch 100). Note that the latches 98 and 100 have different phases (e.g., opposite polarity) on the set and reset inputs due to the fact that the data has different phases on the source encoding. The XOR gates 84, 94 are used to fire the one-shot circuit 102 to recover the clock signal. The correct polarity of the recovered clock is used to sample the two latches 98, 100 to recover the data. The lower limit on the one-shot circuit 102 is the maximum expected bus skew. The upper limit on the one-shot circuit 102 is derived from one half the clock frequency and other internal circuit delays. This arrangement effectively limits the bus frequency, but allows circuit designers sufficient leeway in designing circuits.

Figure 4B:
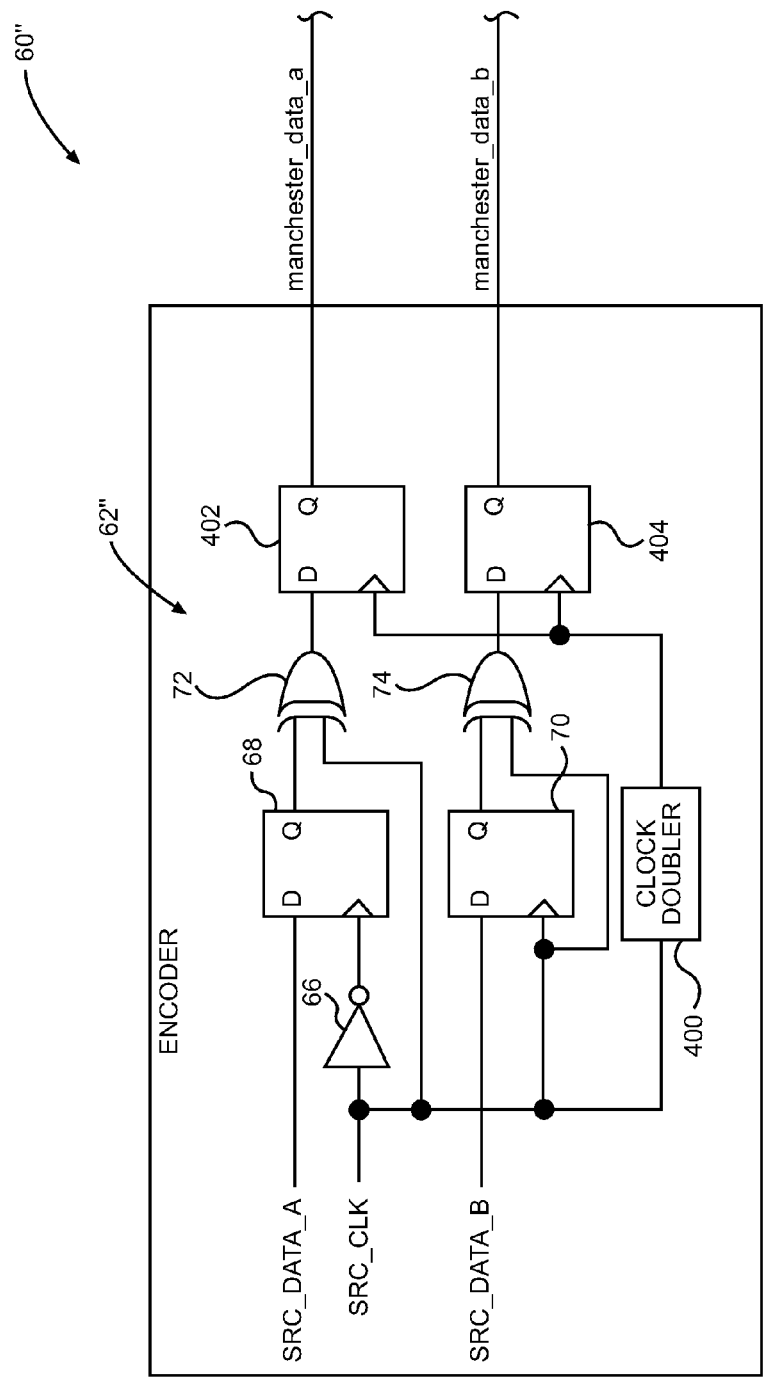
FIG. 4B illustrates second exemplary encoder and decoder circuits capable of addressing the skew illustrated in FIG. 3.
Figure 4B:
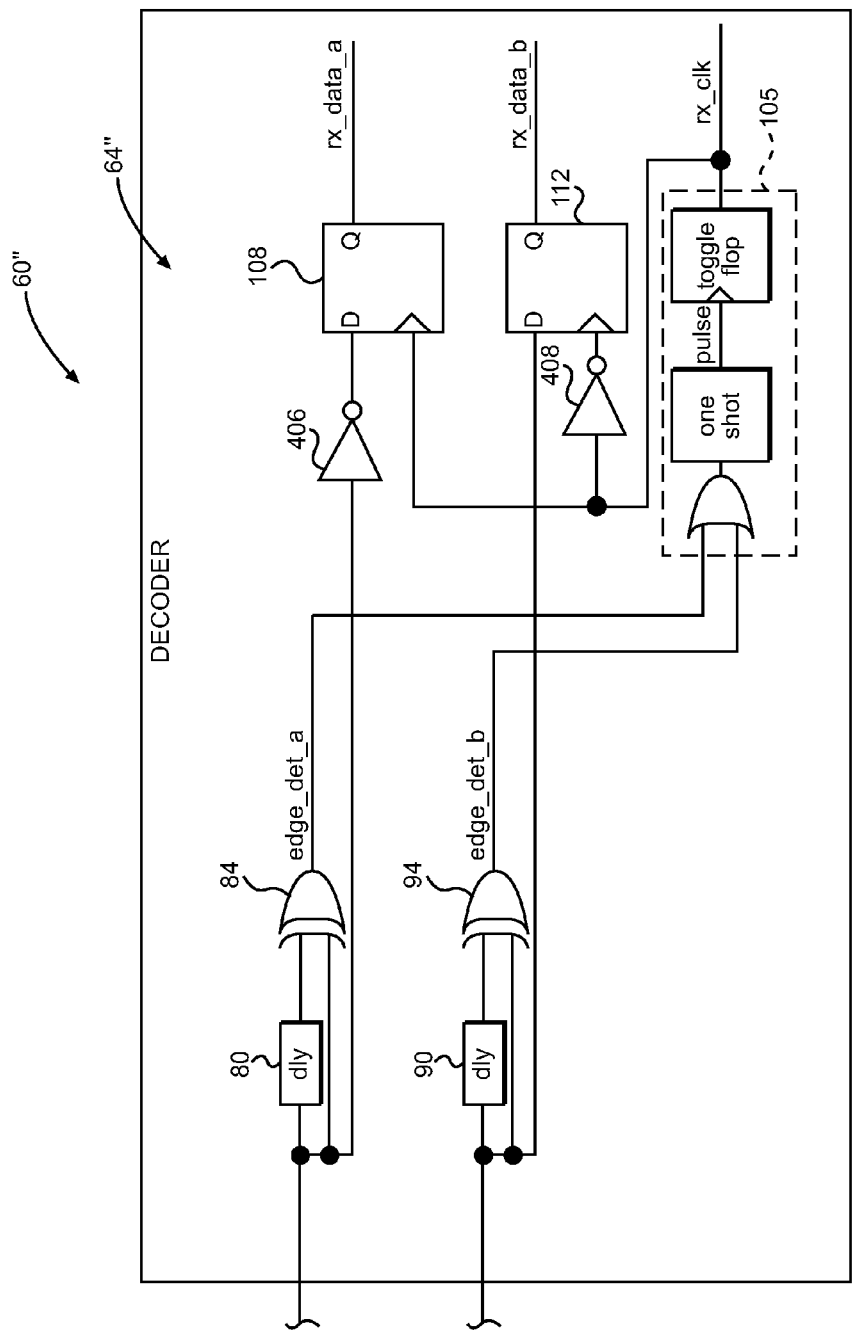

Fewer errors arise if the communication system does not have slivers. Accordingly, FIG. 4B illustrates an exemplary communication system 60" similar to communication system 60, but with fewer (or no slivers). Many of the elements are substantially similar to those previously described. In the encoder 62", a clock doubler 400 is used to provide a clock signal to second rank flip flops 402, 404. Likewise, the decoder 64", some elements are eliminated and inverters 406, 408 provide signals to flip flops 108, 112. This arrangement removes slivers as desired. Note that the clock doubler 400 may be eliminated if the flip flops 402, 404 were sensitive to both riding and falling edges.

Figure 5A:
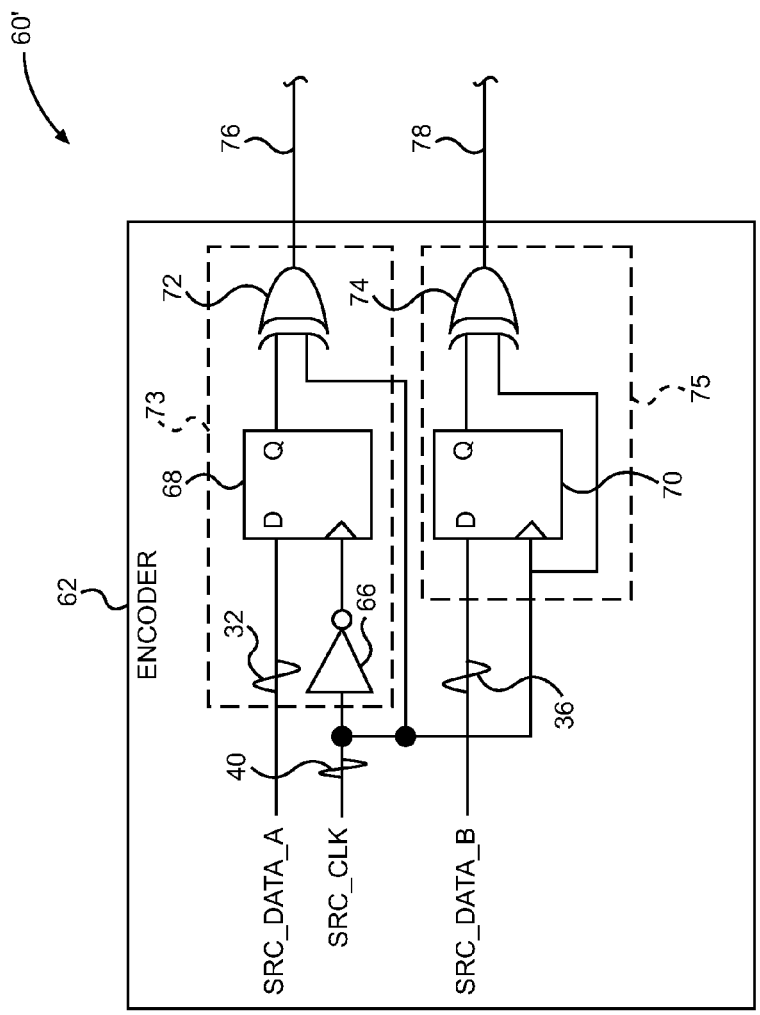
FIG. 5A illustrates exemplary encoder and decoder circuits with additional delay equalization circuitry capable of addressing the skew illustrated in FIG. 3.
Figure 5A:
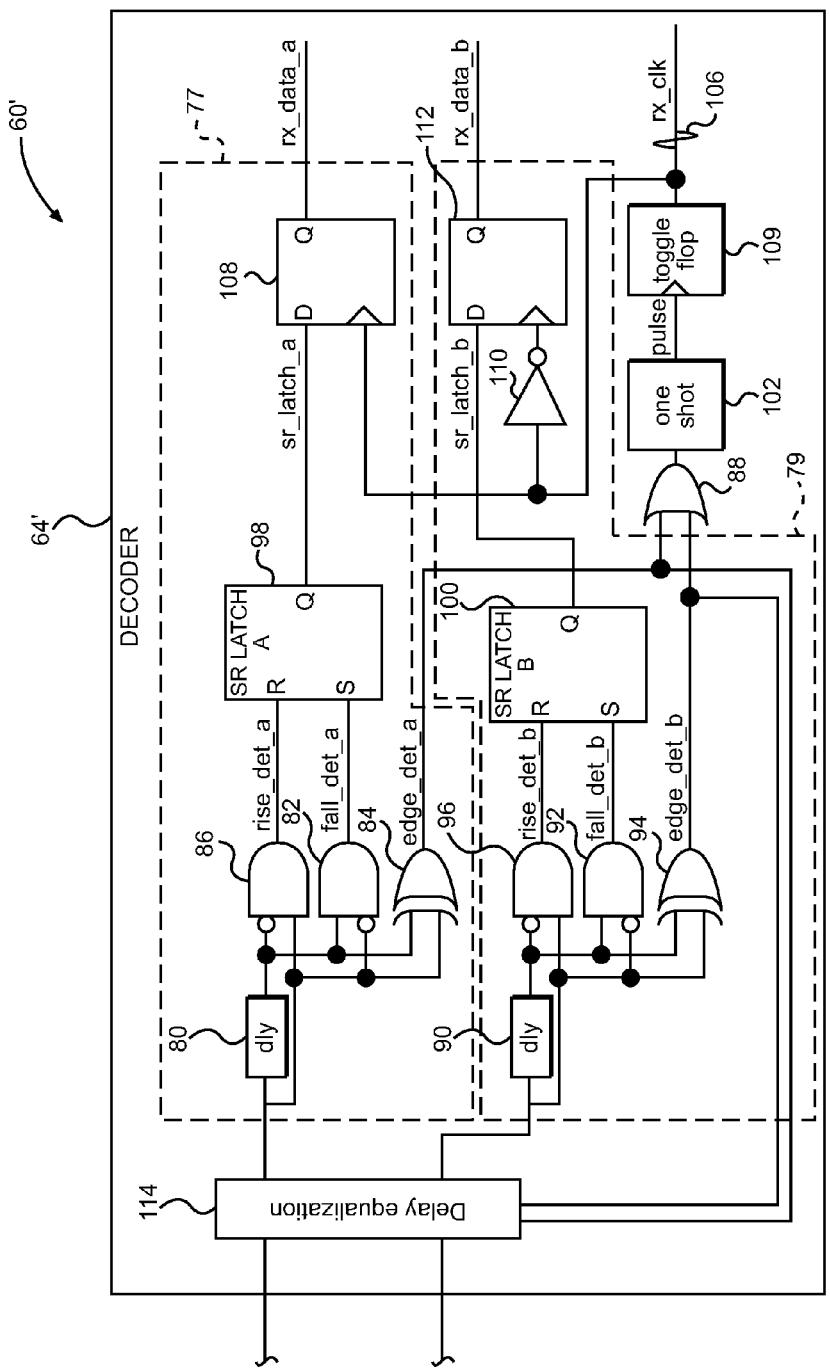

In the event that there is not enough leeway because of the limits on the bus frequency, an additional aspect of the present disclosure allows for use of a delay locked loop (DLL) to equalize bus propagation delays. In this regard, FIG. 5A illustrates a communication system 60' substantially similar to communication system 60 but decoder 64' has a delay equalization circuit 114 (e.g., a DLL). The delay equalization circuit 114 may use a SYNC bit to measure propagation delays. In practice, the SYNC bit is inserted at the encoder 62 and may force a transition both data streams simultaneously. The difference in the arrival of the two transitions on the data channels 76, 78 may be measured and used to adjust delay elements in the delay equalization circuit 114 to reduce skew between the signals on the different data channels 76, 78.

Figure 5B:
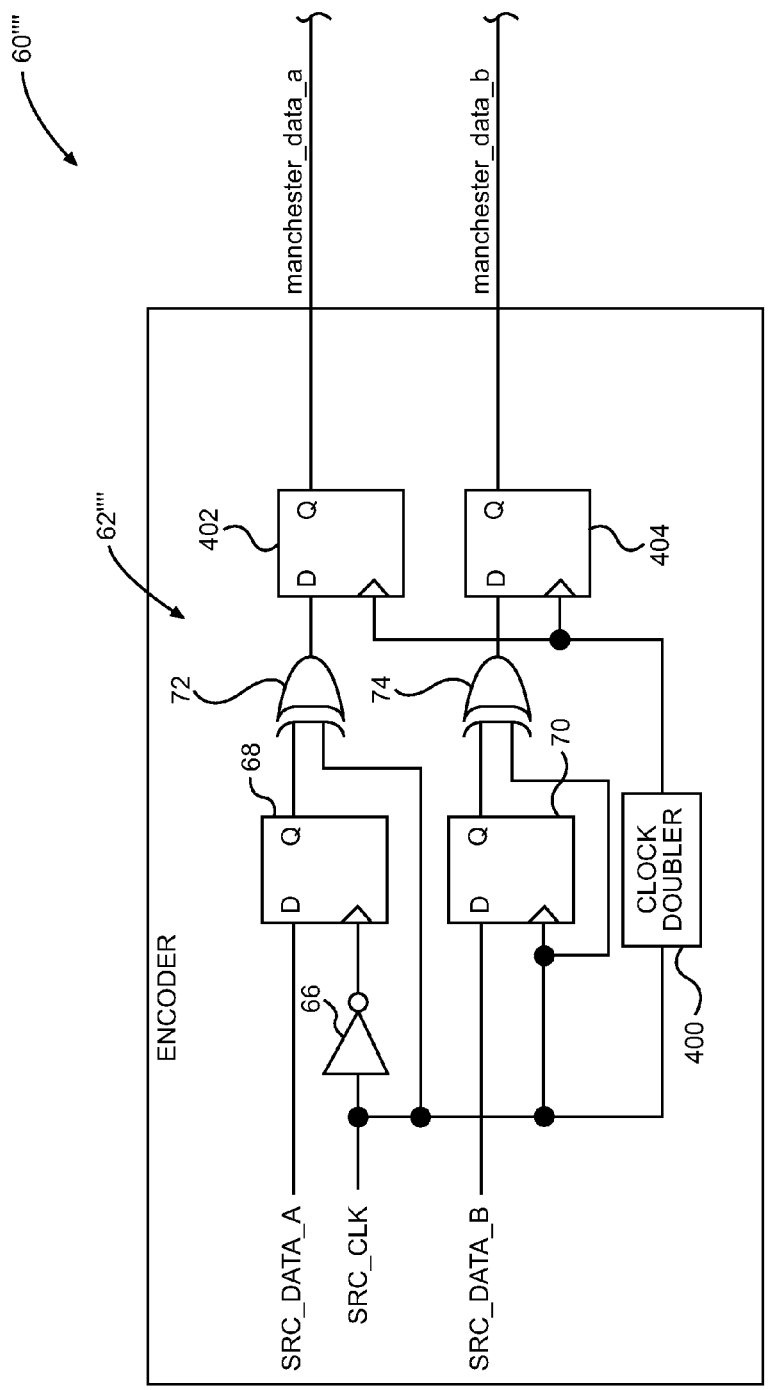
FIG. 5B illustrates second exemplary encoder and decoder circuits with additional delay equalization circuitry capable of addressing the skew illustrated in FIG. 3.
Figure 5B:
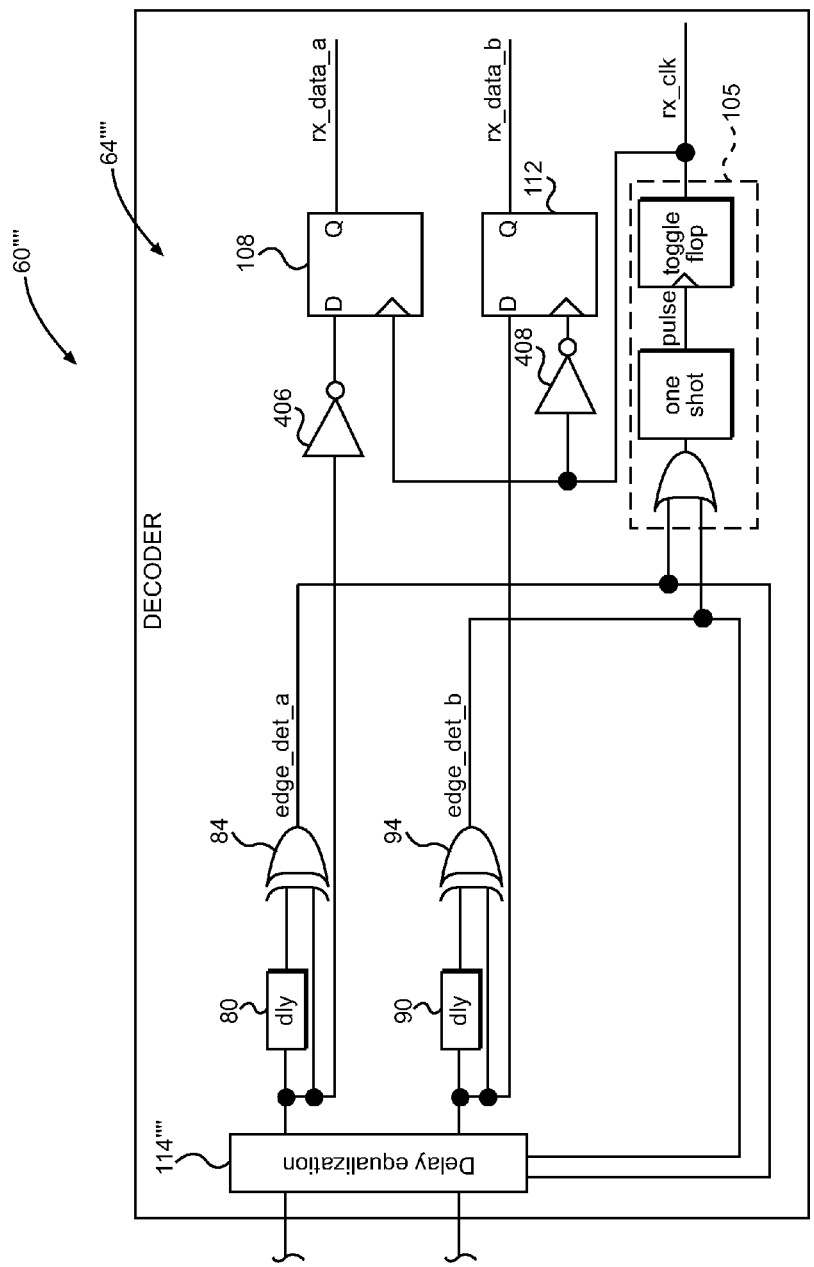

FIG. 5B illustrates a communication system 60''' that is similar to communication system 60" of FIG. 4B, but includes the delay equalization circuit 114"", which is substantially similar to the delay equalization circuit 114 described above with reference to FIG. 5A.

Figure 6:
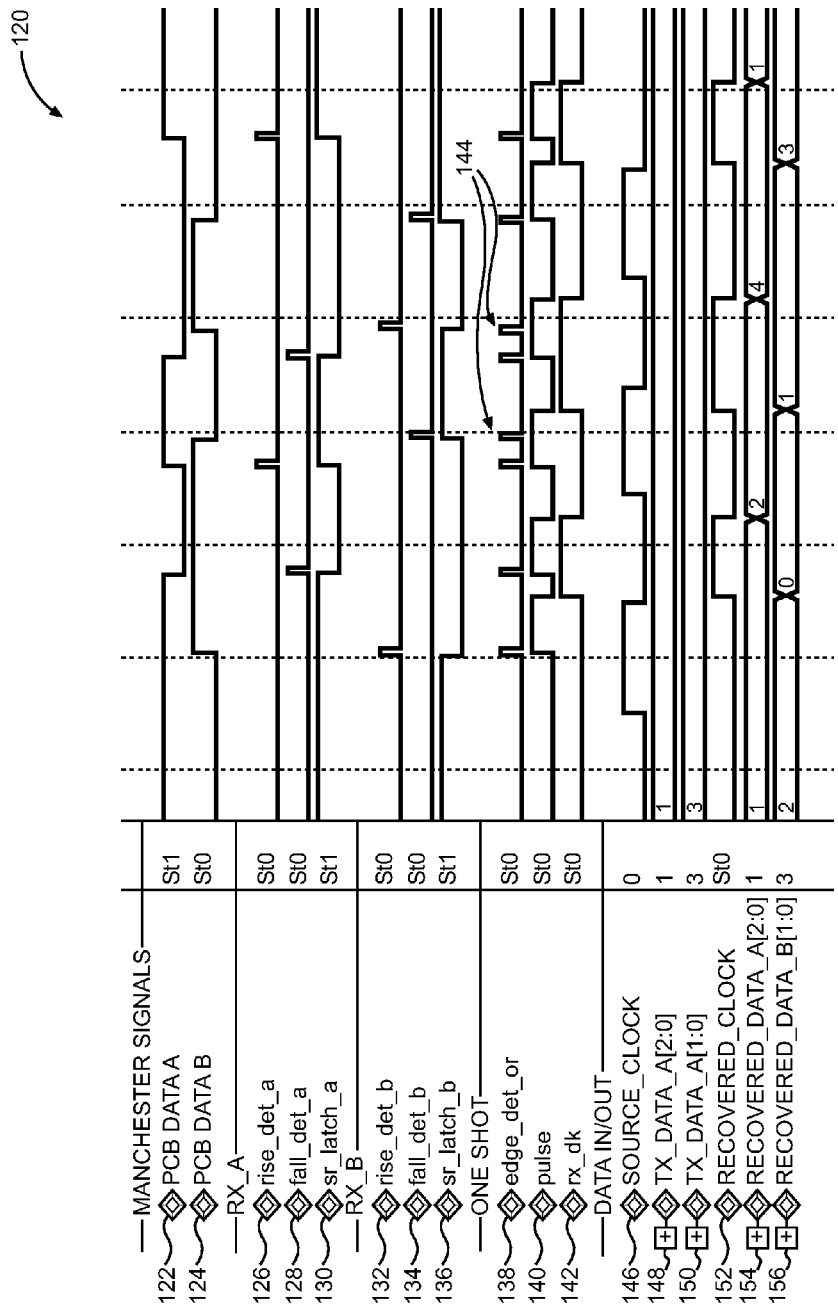
FIG. 6 illustrates an output from a simulation run using the encoding scheme according to an exemplary aspect of the present disclosure.

Simulation shows that aspects of the present disclosure provide substantial benefit. In this regard, FIG. 6 illustrates one exemplary simulation 120 with inputs and results. In particular, simulation 120 includes original encoded signals 122, 124 corresponding to Manchester bit streams 32, 36. Further, signal 126 corresponds to the output of AND gate 86, signal 128 corresponds to the output of AND gate 82, and signal 130 corresponds to the output of the latch 98. Similarly, signal 132 corresponds to the output of AND gate 96, signal 134 corresponds to the output of AND gate 92, and signal 136 corresponds to the output of the latch 100.

With continued reference to FIG. 6, signal 138 is the output of the OR gate 88, signal 140 is the output of the one-shot circuit 102, and signal 142 corresponds to the recovered clock signal 106. The double pulses 144 of the skew can be seen on signal 138. However, the one-shot circuit 102 effectively filters these double pulses 144. The signal 146 corresponds to the original source clock signal 40. The signal 148 corresponds to the original Manchester bit stream 32 and signal 150 corresponds to original Manchester bit stream 36. The signal 152 is identical to signal 142 and is the recovered clock signal 106. The signal 154 is the output of the flip flop 108 and the signal 156 is the output of the flip flop 112 and corresponds to the recovered data signals respectively. As is readily apparent, the recovered clock is distorted relative to the original clock signal 40. However, the data is properly recovered. Specifically, since the clock is embedded into the data, proper data sampling is provided. In this example, the signal 148 is three bits and signal 150 is two bits. The efficiency is five bits per three clock pulses (i.e., 1.67 bits/clock). In comparison, a typical serial interface has an efficiency of one bit per clock pulse. Thus, with eight clocks, fifteen bits can be transmitted, which results in an efficiency of 1.875 bits/clock. The size of signal transmitted can increase arbitrarily without risks associated with systems that require a PLL.

While a two stream system is suitable for some implementations, the present disclosure is not so limited. In particular, N-streams may be used. By way of further example, a three stream case is explored herein. Instead of shifting the streams by 180 degrees as in the two stream case of FIG. 2 described above, the streams are shifted by 120 degrees. Whereas, in the two stream case, the mid-bit transition of a first stream can coincide with the inter-bit transition of the second stream, the three stream case has no coincident mid-bit and inter-bit transitions. Avoiding such coincident transitions eliminates the need for the one-shot circuit 102 of FIG. 4. Elimination of the one-shot circuit 102 allows generation of an all digital receiver that can be developed in a hardware description language (HDL), such as VERILOG (e.g. standard 1800-2012 Feb. 21, 2013 or other IEEE standard, such as IEEE 1364-2005, 1364-2001). Such generic description may then be provided to different foundries for production. Three streams also allows phased detection. During phased detection, only one stream is detected at a given time. While detecting the one stream, the other two streams are ignored, which allows inter-bit transitions on the other two streams to be ignored. Inter-bit transitions do not contain useful information, so ignoring the inter-bit transitions does not negatively impact data transfer.

Figure 7:
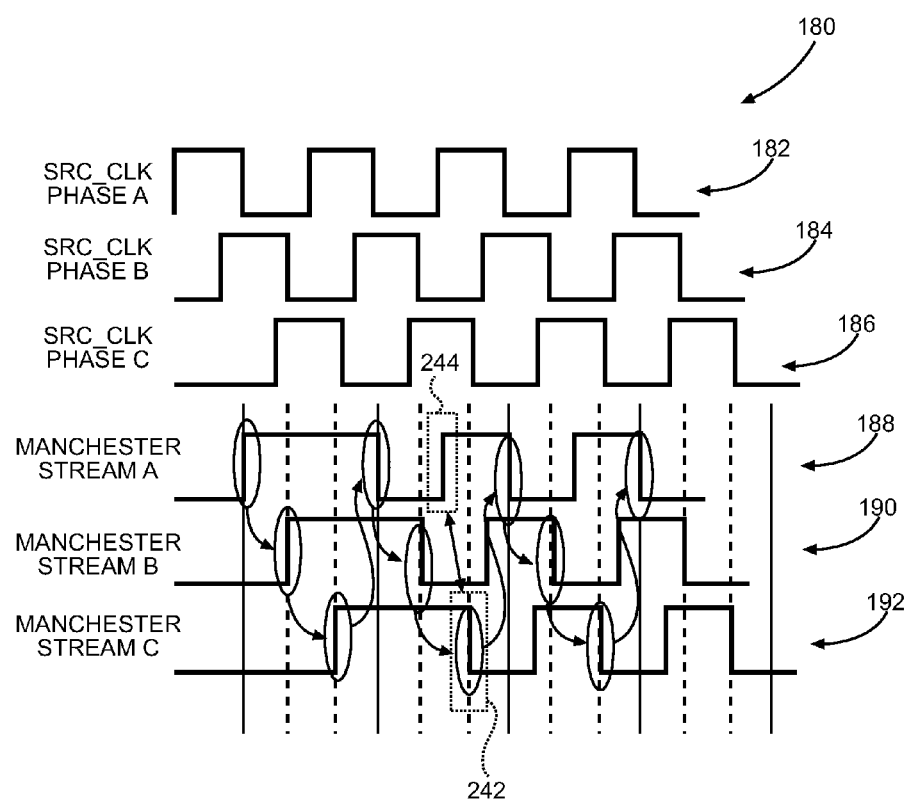
FIG. 7 illustrates a three stream timing diagram.

In this regard, FIG. 7 illustrates a three stream timing diagram 180. Signal 182 corresponds to the clock signal shifted by a first phase amount (e.g., 0 degrees). Signal 184 corresponds to the clock signal shifted by a second phase amount (e.g., 120 degrees). Signal 186 corresponds to the clock signal shifted by a third phase amount (e.g., 240 degrees). Respective Manchester encoded streams 188, 190, and 192 are created according to a Manchester encoding algorithm.

Figure 8:
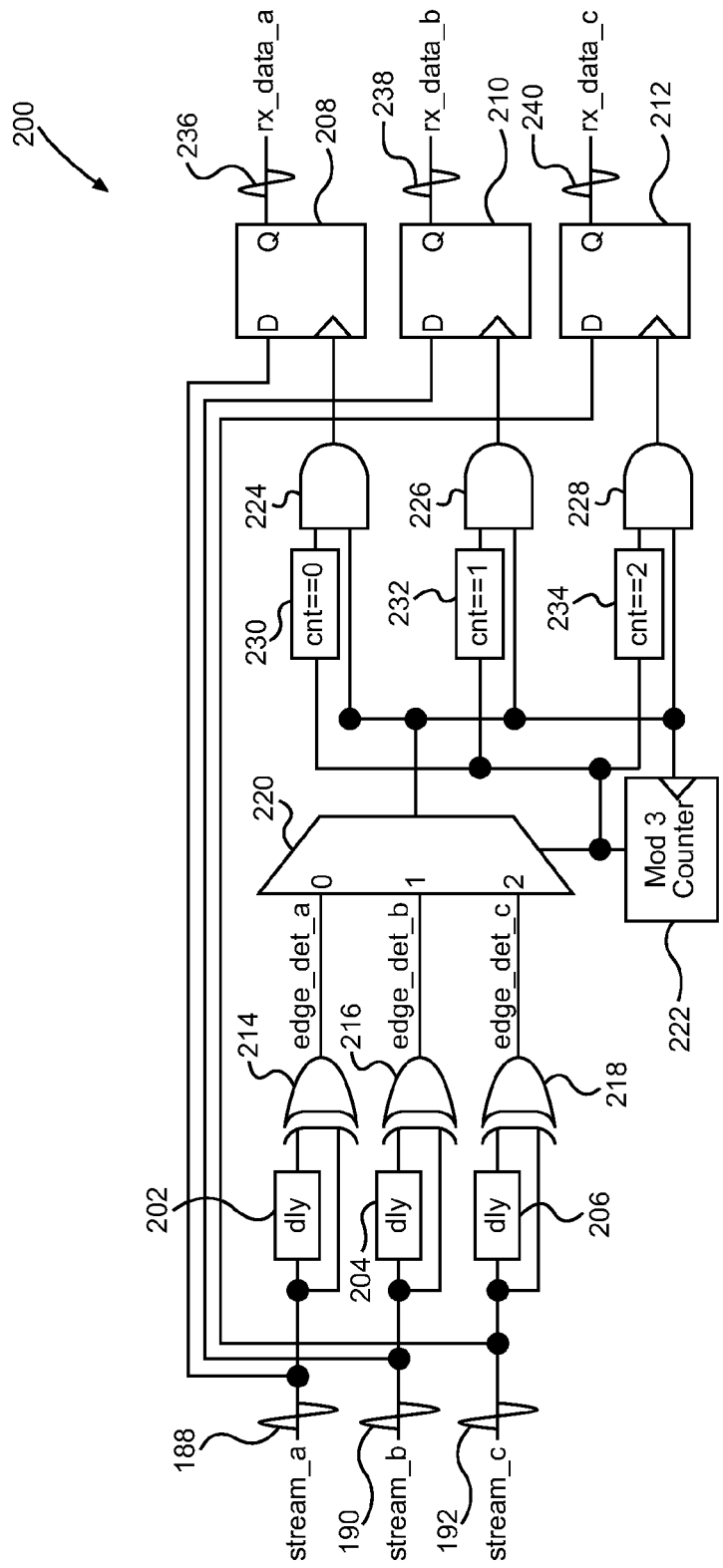
FIG. 8 illustrates a three stream receiver.
Figure 9:
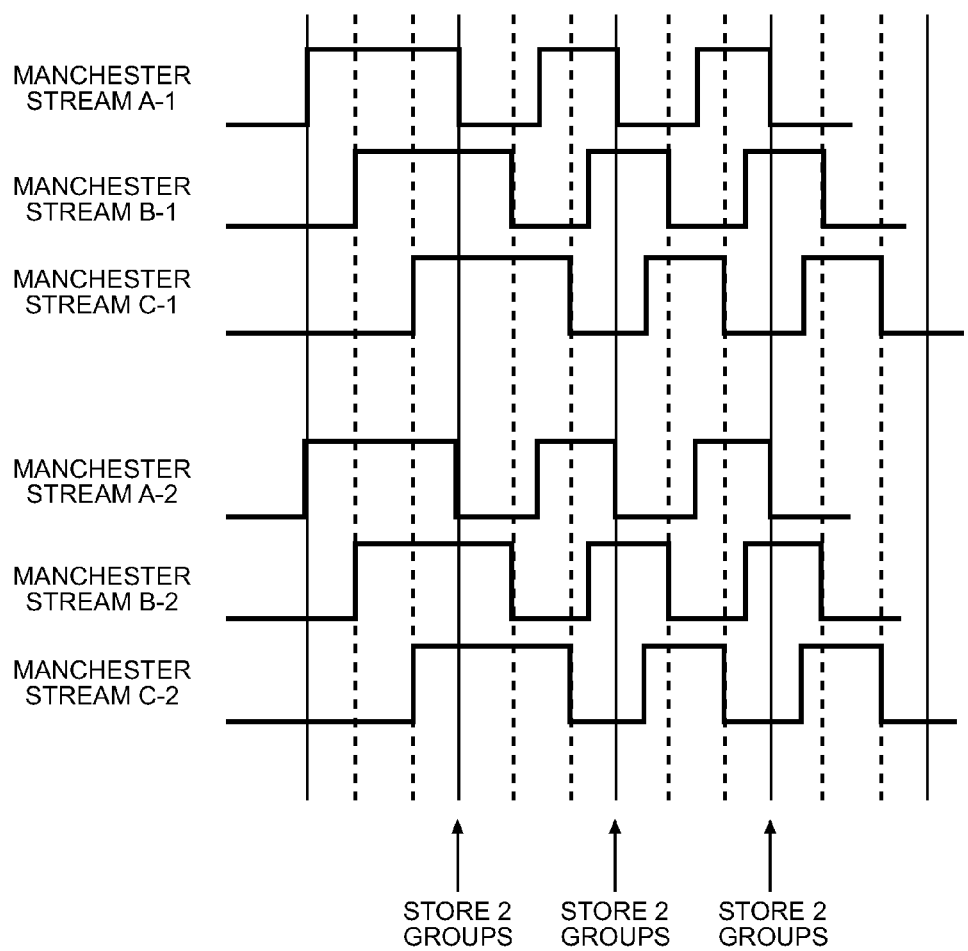
FIG. 9 is a timing diagram illustrating three streams with two groupings therefore.

The three Manchester encoded streams 188, 190, and 192 are provided to a receiver such as receiver 200 illustrated in FIG. 8. The Manchester encoded streams 188, 190, 192 are split and provided to respective delay elements 202, 204, and 206, as well as, respective latches 208, 210, 212. The output of the delay elements 202, 204, 206 are provided with the original Manchester encoded streams 188, 190, 192 to respective XOR gates 214, 216, and 218. The outputs of the XOR gates 214, 216, and 218 are provided to a multiplexer (MUX) 220. The MUX 220 is controlled by a mod-3 counter 222 to select between the signals received from the XOR gates 214, 216, and 218 and output one of the signals to AND gates 224, 226, and 228. The output of the mod-3 counter 222 is also provided to the AND gates 224, 226, and 228 through filters 230, 232, 234. The outputs of the AND gates 224, 226, and 228 are provided to the clock inputs of the latches 208, 210, and 212. This arrangement allows the receiver 200 to mask out unselected streams. That is, the MUX 220 masks out two of the three streams (as dictated by the output of the mod-3 counter 222). As an unmasked edge is detected, the mod-3 counter 222 increments and stores the associated data bit. The filters 230, 232, 234 select which AND gate 224, 226, 228 is active based on the output of the mod-3 counter so as to clock the desired latch 208, 210, 212, which generate received data 236, 238, 240.

With continued reference to FIG. 8, all the elements of the receiver 200 may be implemented in hardware designed in an HDL that is fully synthesized into an all-digital circuit.

Returning to FIG. 7, the receiver 200 may implement a phased detection algorithm. The algorithm uses the XOR gate 214 to perform edge detection on Manchester encoded stream 188. During this time, Manchester encoded streams 190, 192 are masked off. Once an edge is detected, an associated Boolean data bit is stored for a Manchester encoded stream 188. The MUX 220 then selects the output of the XOR gate 216, and Manchester encoded streams 188, 192 are masked off. Once an edge is detected on Manchester encoded stream 190, an associated Boolean data bit is stored. The MUX 220 then selects the output of the XOR gate 218, and Manchester encoded streams 188, 190 are masked off. Once an edge is detected on Manchester encoded stream 192, an associated Boolean data bit is stored. At this time, one complete period of the source clock has expired and the receiver has stored three data bits. The MUX 220 selects the output of the XOR gate 214 and the process repeats.

With reference to FIG. 7, by the time the mid-bit transition 242 has occurred on Manchester encoded stream 192, the inter-bit transition 244 on Manchester encoded stream 188 was ignored by the MUX 220 because the Manchester encoded stream 188 was masked off. This arrangement guarantees the next transition on Manchester encoded stream 188 is a mid-bit transition. In general, this method effectively masks out all inter-bit transitions and only samples mid-bit transitions.

With phased detection, the falling edges of all three phased source clocks are recovered. Two of the edge detected streams can be ORed together to drive a toggle flip flop to recover a clock. The clock will not have a fifty percent duty cycle, but it will have the correct frequency.

The multi-Manchester stream may work with arbitrarily low frequencies because they do not need the same sorts of delays used in other non-PLL designs. It should also be appreciated that the multi-Manchester stream can be used in place of any synchronous serial interface. Manchester encoding inherently has a zero average rather than a forced zero average such as 8b/10b. As a further advantage, in interfaces that have a large number of parallel data bits (e.g., memory), the need to have a large peak current when all data bits transition at the same time is reduced in the multi-Manchester system because of the staggered phase differences. Thus, peak current may be reduced.

It should be appreciated that in systems with very large buses and high periods, it can become difficult to create a unique source clock phase for each data bit. In these instances, the bus can be broken up into M groups that contain N bits each. In each group, there can be N phases of the source clock. Each group can individually detect the corresponding N bits. After each clock period, the M groups are combined into one M*N sized word. In this regard, Figure illustrates an example of a three stream case expanded into M=2 groups.

Those skilled in the art will recognize improvements and modifications to the preferred embodiments of the present disclosure. All such improvements and modifications are considered within the scope of the concepts disclosed herein and the claims that follow.

What is claimed is:

1. A communication system comprising:
   an encoder configured to receive a clock signal, the encoder comprising:
      a first stream encoder configured to:
         receive a first data signal and
         output a first Manchester encoded bit stream with the clock signal embedded therein;
      a second stream encoder configured to:
         receive a second data signal and
         output a second Manchester encoded bit stream with the clock signal embedded therein, such that the second Manchester encoded bit stream is phase shifted relative to the first Manchester encoded bit stream;
      a first output configured to couple the first Manchester encoded bit stream into a first data channel; and
      a second output configured to couple the second Manchester encoded bit stream into a second data channel.

2. The communication system of claim 1 wherein the first stream encoder comprises an inverter configured to receive the clock signal and a flip flop coupled to an output of the inverter so as to receive an inverted clock signal from the inverter.

3. The communication system of claim 2 wherein the first stream encoder comprises an XOR gate configured to receive the clock signal and an output from the flip flop.

4. The communication system of claim 1 wherein the second stream encoder comprises a flip flop configured to receive the clock signal and the second data signal.

5. The communication system of claim 4 wherein the second stream encoder comprises an XOR gate configured to receive the clock signal and an output from the flip flop.

6. A communication system comprising:
   a decoder comprising:
      a first input configured to be coupled to a first data channel;
      a second input configured to be coupled to a second data channel;
      a first stream decoder configured to receive a first Manchester encoded signal from the first data channel and output a first recovered data signal;
      a second stream decoder configured to receive a second Manchester encoded signal from the second data channel and output a second recovered data signal; and
   a clock recovery circuit configured to receive edge information from each of the first Manchester encoded signal and the second Manchester encoded signal and extract therefrom a recovered clock signal, the clock recovery circuit coupled to the first stream decoder and the second stream decoder and configured to provide the recovered clock signal to the first stream decoder and the second stream decoder.

7. The communication system of claim 6 wherein the first stream decoder comprises a first AND gate configured to detect rising edges and a second AND gate to detect falling edges in the first Manchester encoded signal.

8. The communication system of claim 7 wherein the first stream decoder comprises a latch coupled to an output of the first AND gate and an output of the second AND gate.

9. The communication system of claim 6 wherein the clock recovery circuit comprises a one-shot circuit.

10. The communication system of claim 9 wherein the clock recovery circuit further comprises a toggle flop coupled to an output of the one shot circuit and producing the recovered clock signal that is provided to the first stream decoder and the second stream decoder.

11. The communication system of claim 6 further comprising a delay equalization circuit interposed between the first input and the first stream decoder, the delay equalization circuit further interposed between the second input and the second stream decoder.

12. The communication system of claim 11 wherein the delay equalization circuit comprises a delay locked loop.

13. The communication system of claim 9 wherein:
the first stream decoder comprises a first edge detection XOR gate;
the second stream decoder comprises a second edge detection XOR gate; and
the clock recovery circuit comprises an OR gate coupled to outputs of the first edge detection XOR gate and the second edge detection XOR gates.

14. A method of communicating comprising:
Manchester encoding a first bit stream using a first stream encoder;
Manchester encoding a second bit stream using a second stream encoder with a different phase relative to the first bit stream;
transmitting Manchester encoded bit streams across respective data channels;
extracting a common clock signal from the Manchester encoded bit streams; and
using the common clock signal to recover the first bit stream and the second bit stream.

15. The method of claim 14 further comprising inverting a clock signal at the first stream encoder to create the different phase.

16. The method of claim 14 further comprising filtering received clock pulses with a one-shot circuit.

17. The method of claim 14 further comprising equalizing delay between received Manchester encoded bit streams.

18. The method of claim 14 further comprising using AND gates to detect a fall and a rise in received Manchester encoded bit streams.

19. A communication system comprising:
an encoder configured to receive a clock signal, the encoder comprising:
  a first stream encoder configured to:
    receive a first data signal and
    output a first Manchester encoded bit stream with the clock signal embedded therein;
  a second stream encoder configured to:
    receive a second data signal and
    output a second Manchester encoded bit stream with the clock signal embedded therein, such that the second Manchester encoded bit stream is phase shifted relative to a phase of the first Manchester encoded bit stream;
a first output configured to couple the first Manchester encoded bit stream into a first data channel; and
a second output configured to couple the second Manchester encoded bit stream into a second data channel.

20. The communication system of claim 19 further comprising a third stream encoder configured to receive a third data signal and output a third Manchester encoded bit stream with the clock signal embedded therein, such that the third Manchester encoded bit stream is phase shifted relative to the phase of the first and second Manchester encoded bit streams.

* * * * *